July 3, 1962 R. JUST ET AL 3,042,802
RADIATION DETECTORS
Filed Jan. 6, 1959
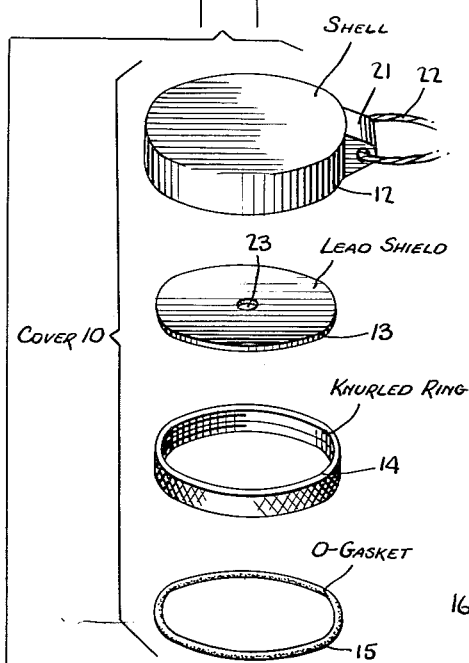
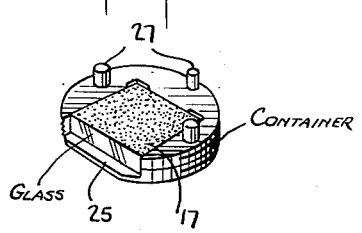
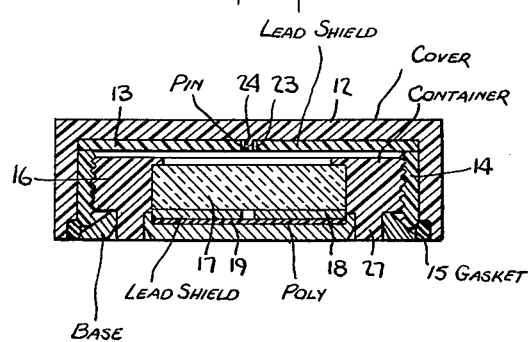
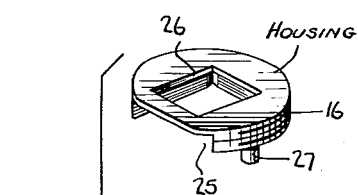
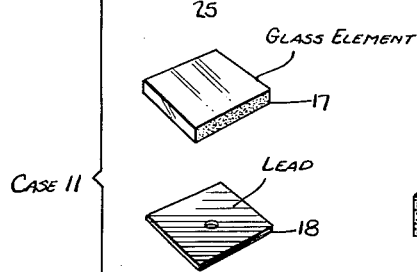
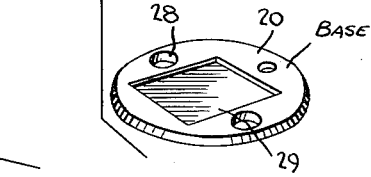
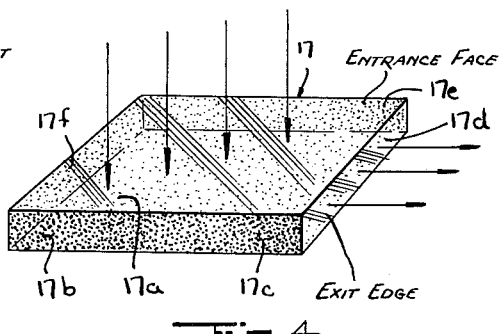
INVENTORS
RICHARD JUST
ADNAN WALY
BY
ATTORNEYS 3,042,802
RADIATION DETECTORS
Richard Just, Flushing, and Adnan Waly, Rego Park, N.Y., assignors to Specialty Engineering & Electronics Company, Brooklyn, N.Y., a partnership
Filed Jan. 6, 1959, Ser. No. 785,264
11 Claims. (Cl. 250—83)

The present invention relates generally to radiation detectors and more particularly to an improved dosimeter including a radio-photoluminescent element.

The hazards of radiation are now such that it is common practice to require individuals exposed to radioactive sources to wear a detector sensitive to X-ray and gamma-ray radiation for effectively totalizing the radiation dosage to which the wearer has been subjected. One widely used detector of this type is constituted by small pendant-like case worn about the neck containing a sensitive element constituted by a specially prepared silver activated square of phosphate glass.

The radio-photoluminescent characteristics of this element are such that it will luminesce under ultra-violet light after prior exposure to X or gamma radiation. The element acts as an integrating device to indicate the total amount of radiation to which the detector has been exposed up to the time of a reading.

When the total dosage of a radiation detector is to be measured, it is placed in a dosimeter reader or computer where it is exposed to an ultra-violet light to cause the glass element to luminesce with an intensity proportional to the accumulated radiation. By the use of a photo-multiplier the light rays are converted into an electrical signal whose amplitude is measured to afford the desired indication. A preferred form of a dosimeter reader is disclosed in the copending application of Just, Serial No. 762,466, filed September 22, 1958.

It is important that precise dosimeter readings be obtained in order that the degree of exposure be accurately known. Studies have shown that radiation exposure above certain established levels is extremely dangerous. In the interests of safety, therefore, dosage data must be exactly determined. While it is possible with existing reader apparatus to measure the degree of luminescence of the sensitive glass element with extreme accuracy, the reading may nevertheless be misleading as to the degree of actual exposure. This is due to instability factors in the detector itself.

The reason for such instability resides in the structural design of standard dosimeters. A sensitive glass element exhibits a so-called pre-dose which takes the form of luminescence prior to irradiation, the pre-dose arising partly from impurities contained in the glass. If the pre-dose factor is constant, it can readily be accounted for in determining the actual exposure. For example, if the detector has, prior to radiation exposure, luminescence equivalent to that induced by 37 roentengens, then this pre-dose can be deducted from the dosimeter reading. However, if the pre-dose tends to drift in value then the ultimate reading is spurious regardless of the precision of measurement. We have found that conventional dosimeters possess a slowly creeping pre-dose characteristic by reason of external contaminants or changes in the glass surface or backing. Heretofore it has been the practice to paint the sensitive glass square on the back face and on three edges with an opaque coating or lacquer. The top or entrance face is unpainted so as to admit ultra-violet radiation and the remaining edge is unpainted to provide an exit for luminescence. Such painted surfaces are subject to change as a result of mechanical abrasion as well as weathering and washing by field personnel. Consequently changes occur in the absorption and reflectivity of the painted surfaces which give rise to apparent changes in the dosage.

Another factor producing creepage in the pre-dose is the existence of materials in the dosimeter casing which contains volatile fluorescent substances. Such substances tend to deposit on the glass surface of the sensitive element and generate spurious indications. In conventional casing designs, elastomer gaskets are used to achieve waterproofing. The lead shields and the glass element are mounted within the casing by means of adhesives or cement. In both instances we have found these substances to produce fluorescent condensation of the glass surface.

In view of the foregoing, it is the principal object of this invention to provide an improved dosimeter structure which is stable and reliable in operation and which exhibits a pre-dose that remains constant in the course of time, whereby the dosage indication is accurate.

More specifically, it is an object of the invention to provide a sensitive glass element having opaque surfaces formed by non-fluorescent material which is permanent and stable and is substantially unaffected by mechanical abrasion, weathering and washing. A significant feature of the invention resides in the use of a fritting technique to coat the surfaces of the glass square.

Also an object of the invention is to provide a waterproof casing for a dosimeter element which is free of adhesives or any other material containing volatile fluorescent substances.

Still another object of the invention is to provide a dosimeter casing which may be manufactured at relatively low cost and which may be readily assembled without the use of bonding agents or special tools.

For a better understanding of the invention as well as other objects and further features thereof, reference is had to the following detailed description to be read in conjunction with the accompanying drawing, wherein like components in the various views are identified by like reference numerals.

In the drawings:

FIG. 1 is an exploded view of a dosimeter assembly in accordance with the invention.

FIG. 2 is a perspective view of the housing for the sensitive glass element.

FIG. 3 is a sectional view taken through the assembled dosimeter.

FIG. 4 is a perspective view of the sensitive glass element.

Referring now to the drawings, a dosimeter assembly in accordance with the invention is constituted by a cover generally designated by numeral 10 consisting of the components embraced within the bracket in the upper half of FIG. 1, and a case generally designated by numeral 11 consisting of the components embraced within the bracket in the lower half of FIG. 1. The cover components comprise shell 12, shield disc 13, retaining ring 14 and gasket 15, and the case components comprise housing 16, sensitive glass element 17, shield square 18, insulation pad 19 and base 20.

Shell 12 is in the form of a cylindrical cup, preferably fabricated of black ethyl-cellulose material or any other suitable plastic having no adverse effect on the skin of the wearer. Shell 12 has a lug 21 integral therewith provided with a hole through which a string 22 passes to permit the user to wear the dosimeter about his neck.

The round shield 13 is formed of lead having a thickness for example in the order of 0.045 inch and is provided with a center hole 23. The shield 13 has a diameter approximately equal to the inner diameter of the shell and is received over a center pin 24 projecting from the base of the shell. Retaining ring 14 preferably is formed of black anodized aluminum, the inner surface being threaded and the outer surface being knurled. After the shield 13 is placed within the shell, the aluminum ring 14 is force fitted therein to lock the shield in place without adhesive and to provide a socket for threadably receiving the case 11.

Placed in a circumferential groove formed in the interior wall of shell 12 at the open end thereof is the gasket 15 in the form of an O ring constituted by irradiated polyethylene material. The advantage of polyethylene is its purity and the absence of any plasticizers. Irradiation of the ring produces cross-linkage effects therein, thereby eliminating permanent deformation when the ring is deformed for long periods of time especially at elevated temperature and then released. To hold the gasket in place, the plastic of the shell may be heat crimped thereover.

The polyethylene gasket contains no plasticizer or other agent which in aging would leave a condensate on the glass element and cause fluorescence. Thus the cover is assembled without cement or the use of materials which might introduce radiometric, fluorescent impurities.

The housing 16 of the case is molded of the same plastic material as shell 12 and is constituted by an externally threaded round wafer having a rectangular recess 25 extending inwardly from the periphery to accommodate sensitive element 17. A rectangular window 26 whose dimensions are somewhat smaller than that of the recess and the element is formed in the other side of the housing to expose the entrance face of the element, the exit edge of the element lying at the peripheral opening of the recess 25. Thus when the case is removed from the cover and placed in a reader, the glass element may be exposed to ultra-violet and light rays extracted therefrom without taking the glass from its housing.

Housing 16 is provided at triangular positions with three mounting pins 27 which are receivable in correspondingly positioned holes 28 in base 20. Base 20 is formed of a disc of black anodized aluminum and has a rectangular well 29 cut therein at a position in registration with the recess 25 in the housing. Received within well 29 is the rectangular polyethylene insulating pad 19, above which is placed the lead shield 18 of the same size and shape, the shield being flush with the surface of the base.

When the housing is mounted by pins 27 on base 29 and the pins heat crimped to secure the combination, a sandwich is formed of the glass element 17, shield 18 and pad 19, these components being held firmly in place without the use of adhesives or cement. The case thus assembled is screwed into the cover, the external threads on housing 16 engaging the internal threads on ring 14 and the circular rim of base 20 engaging the gasket 15 to seal the dosimeter. Anodization of the metal parts prevents migration of the metal and contamination of the dosimeter. The plastic parts may, in the alternative, also be made of black anodized metal.

The radio-photoluminescent glass element 17 is preferably of a composition which is eight parts by weight silver metaphosphate, 25 parts by weight barium metaphosphate, 25 parts by weight potassium metaphosphate and 50 parts by weight aluminum metaphosphate. Such glass emits luminescent light in the 4200 to 7000 A. region under near ultra-violet irradiation after prior exposure to X or gamma radiation. The intensity of luminescent light is proportional to the amount of X or gamma radiation and the radiation of the ultra-violet light to which it is exposed.

Glass element 17 is a six sided body having an upper face 17a, a lower face 17b and four edges 17c, 17d, 17e and 17f. The top face 17a is the entrance face for the ultra-violet light and is uncoated, while the edge 17d is the exit face for the emitted light and is also uncoated. All other surfaces are fritted in accordance with the invention by the use of a special black non-reflecting and non-fluorescing vitreous material. By the use of frit in lieu of paint, a major cause of changes in intensity of luminescent light prior to irradiation is eliminated.

The nature of the frit must be such that it will not fluoresce under ultra-violet light. Moreover, the frit must be constituted by ingredients which will melt at a temperature below the melting point of the phosphate glass. The composition of the frit is restricted to those elements only which appear in groups 1, 2, 3, 4, 5, 6 and 8 of Mendeleeff's periodic arrangement of the elements. This statement however is applicable only for those elements which appear in quantities greater than 0.1%.

In one example, the frit is formed of powdered glass with oxides such as iron oxide, lead oxide, chrome oxide and cobalt oxide, the frit having a melting point of 850° F. as against the melting point of the phosphate glass at 950° F. The glass powder may be composed of the same glass as is used for the element minus the radio-photoluminescent ingredients.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A dosimeter assembly comprising a cover and a case engageable therewith, said cover being constituted by a cup-shaped shell and a lead shield disposed on the bottom thereof, said case being constituted by a housing receivable within said cover and having a rectangular recess formed in one side of the housing inwardly of the periphery thereof and a window formed in the other side thereof communicating with said recess, a sensitive glass element receivable in said recess and having one face exposed through said window and one edge exposed at said periphery, a fritted coating of non-reflecting, non-fluorescent material on the unexposed surfaces of said glass element, and a base secured to said housing abutting said one side therein, said base having a well in registration with said recess and containing a shield.

2. A dosimeter assembly comprising a cover and a case threadably engageable therewith, said cover being constituted by a cup-shaped shell, a shield disc disposed on the bottom of the shell, an internally-threaded retaining ring received in the shell for holding the shield therein and a gasket disposed within the shell at the open end thereof, said case being constituted by an externally-threaded housing engageable with the ring in said cover and having a rectangular recess formed in one side of the housing inwardly of the periphery thereof and a window formed in the other side thereof communicating with said recess, a sensitive glass element receivable in said recess and having one face exposed through said window and one edge exposed at said periphery, a base secured to said housing abutting said one side therein, said base having a well in registration with said recess, an insulating pad in said well and a shield in said well over said pad.

3. In a dosimeter assembly, a case for supporting a sensitive glass element comprising a cylindrical housing having a rectangular recess formed in one side of the housing inwardly of the periphery thereof and a window formed in the other side thereof communicating with said recess, said sensitive glass element being receivable in said recess and having one face exposed through said window and one edge exposed through said recess, a fritted coating of non-reflecting, non-fluorescent material on the unexposed surfaces of said glass element, said window having smaller dimensions than said recess to retain said element, a base secured to said housing abutting said one side therein, said base having a well in registration with said recess and a shield in said well.

4. A dosimeter assembly comprising a cover and a case threadably engageable therewith, said cover being constituted by a cup-shaped shell formed of ethyl-cellulose, a lead shield disposed on the bottom of the shell, an internally-threaded metal retaining ring securely received in the shell and holding the shield therein and a polyethylene gasket disposed within the shell at the open end thereof, said case being constituted by an externally threaded housing formed of ethyl-cellulose engageable with the ring in said cover and having a rectangular recess formed in one side thereof and a window formed in the other side thereof communicating with said recess, a sensitive glass element receivable in said recess and having one face exposed through said window and one edge exposed through said recess, a base secured to said housing abutting said one face therein, said base having a well in registration with said recess, an insulating pad in said well and a shield in said well over said pad.

5. A sensitive element for a dosimeter comprising a radio-photoluminescent phosphate glass square, a fritted coating formed of non-reflecting, non-fluorescent material on one face of said square and on three edges thereof.

6. An element, as set forth in claim 5, wherein said frit is composed of ingredients having a melting point not exceeding the melting point of the square.

7. An element, as set forth in claim 5, wherein the frit is formed of powdered glass mixed with oxides.

8. An element, as set forth in claim 7, wherein said oxide is iron oxide.

9. An element, as set forth in claim 7, wherein said oxide is chrome oxide.

10. An element, as set forth in claim 7, wherein said oxide is lead oxide.

11. An element, as set forth in claim 7, wherein said oxide is cobalt oxide.

References Cited in the file of this patent

UNITED STATES PATENTS

| | | |
|---|---|---|
| 2,730,625 | Shurcliff | Jan. 10, 1956 |
| 2,750,515 | Shurcliff | June 12, 1956 |
| 2,752,505 | Klick | June 26, 1956 |
| 2,882,414 | Joyner et al. | Apr. 14, 1959 |